April 25, 1944.  M. S. RUDD  2,347,579
HEDGE TRIMMER
Filed July 7, 1943   2 Sheets-Sheet 1
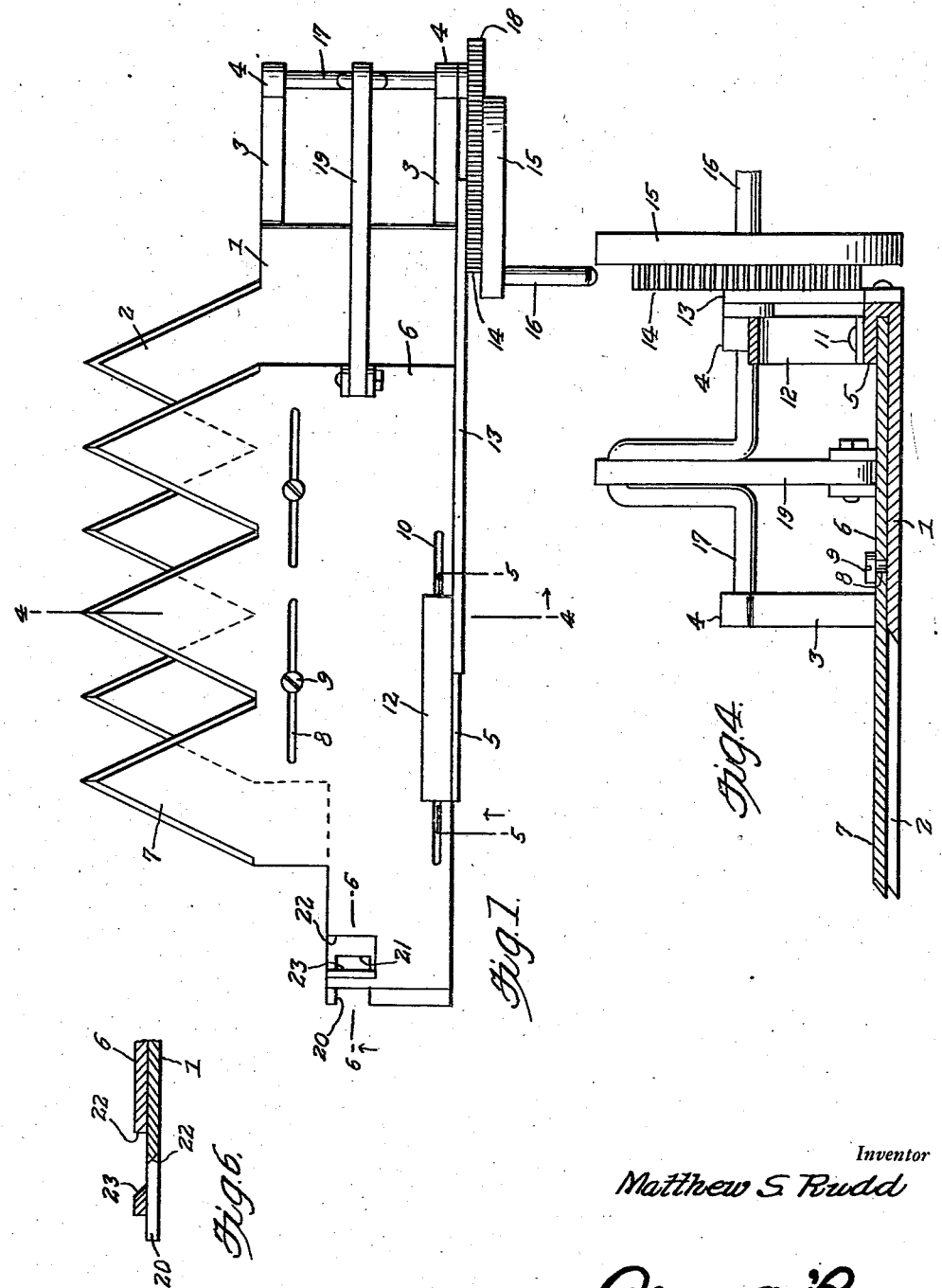
Inventor
Matthew S. Rudd
By Clarence A. O'Brien
and Harvey B. Jacobson
Attorneys April 25, 1944.  M. S. RUDD  2,347,579
HEDGE TRIMMER
Filed July 7, 1943   2 Sheets-Sheet 2
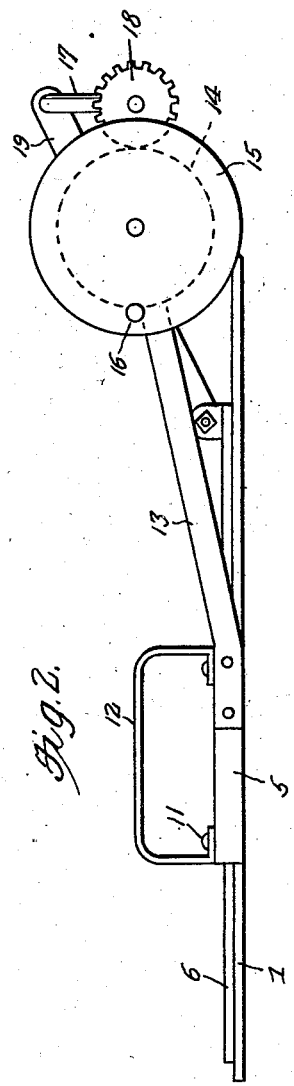
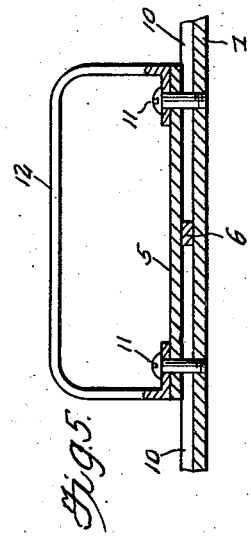
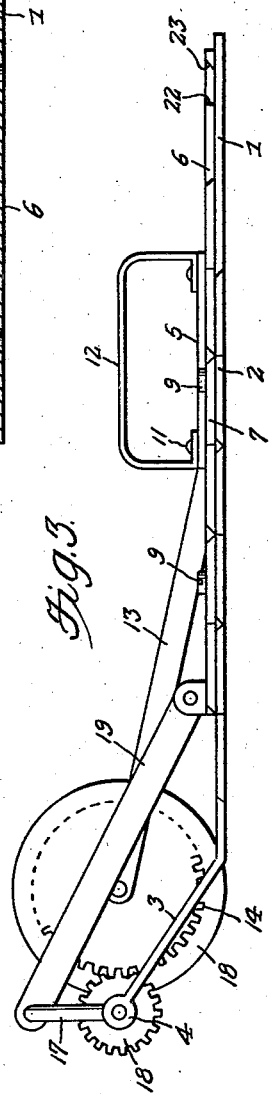
Inventor
Matthew S. Rudd Patented Apr. 25, 1944

2,347,579

UNITED STATES PATENT OFFICE 2,347,579

HEDGE TRIMMER

Matthew S. Rudd, Elizabeth City, N. C.

Application July 7, 1943, Serial No. 493,772

1 Claim. (Cl. 30—197)

The present invention relates to new and useful improvements in hedge, shrubbery, etc., trimmers, and has for its primary object to provide, in a manner as hereinafter set forth, a device of this character comprising a sickle of unique construction which is adapted to be held in one hand and manually operated with the other.

Another very important object of the invention is to provide a hedge, shrubbery, etc., trimmer of the aforementioned character which embodies unique means for expeditiously cutting twigs and small limbs.

Other objects of the invention are to provide a hedge trimmer of the character set forth which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a hedge trimmer constructed in accordance with the present invention.

Figure 2 is a view in rear elevation of the device.

Figure 3 is a front elevational view.

Figure 4 is a cross sectional view, taken substantially on the line 4—4 of Figure 1.

Figure 5 is a fragmentary view in longitudinal section, taken substantially on the line 5—5 of Figure 1.

Figure 6 is a detail view in longitudinal section through an end portion of the device, taken substantially on the line 6—6 of Figure 1.

Referring now to the drawings in detail, it will be seen that the form of the invention which has been illustrated comprises a stationary, metallic lower bar 1 having projecting from its front edge integral, substantially triangular blades 2. Projecting longitudinally from one end of the stationary bar 1 is a pair of spaced arms 3 having bearings 4 on their outer ends. An upwardly and forwardly extending guide 5 is provided on the rear edge of the stationary bar 1 at an intermediate point.

An upper bar 6 of suitable metal is mounted for reciprocation on the bar 1 in the guide 5. Integral triangular blades 7 project forwardly from the bar 6 for coaction with the stationary blades 2. Longitudinal slots 8 in the forward portion of the bar 6 accommodate guide and retaining screws 9 which are threadedly mounted in the stationary lower bar 1. The bar 6 is further provided, in its rear portion, with longitudinal slots 10. As best seen in Figure 5 of the drawings, the slots 10 accommodate screws 11 which secure a handle 12 in position on the guide 5, said screws passing downwardly thru said guide and being threadedly engaged in the lower bar 1.

Rigidly mounted on the back of the guide 5 and extending toward one end of the device is an inclined arm 13. A gear 14 is journaled on the free end portion of the arm 13. Fixed on one side of the gear 14 is a comparatively large disk 15 having mounted thereon an operating handle 16. A crank shaft 17 is journaled in the bearings 4. A pinion gear 18 on one end of the crankshaft 17 is engaged with the gear 14 for actuation thereby. A pitman 19 connects the reciprocating upper bar 6 to the crankshaft 17 for actuation thereby.

Extending longitudinally into the end portion of the stationary lower bar 1 which is remote from the crankshaft 17 is an opening 20 for the reception of small limbs, twigs, etc. As best seen in Figure 6 of the drawings, the inner wall of the opening 20 is tapered in a manner to provide a blade 21. Extending into the corresponding end portion of the reciprocating upper bar 6 from the forward edge thereof is an opening 22 for communication with the opening 20. The outer side wall of the opening 22 is tapered in a manner to provide a blade 23 for coaction with the blade 21.

It is thought that the operation of the device will be readily apparent from a consideration of the foregoing. Briefly, the sickle is held in one hand through the medium of the handle 12 and the reciprocating upper bar 6 is actuated on the stationary lower bar 1 through the medium of the handle 16. It will thus be seen that the device is held and manipulated with one hand and operated with the other hand. Of course, the moving blades 7 travel back and forth across the stationary blades 2 for cutting the hedge, shrubbery, etc., therebetween. When additional power is desired for cutting small limbs, twigs, etc., the crankshaft 17 is actuated to project the remote end of the reciprocating bar 6 beyond the corresponding end of the stationary bar 1, thus permitting the engagement of such limbs or twigs in the opening 20. The crankshaft 17 is then actuated for pulling the bar 6 inwardly on the bar 1, whereby the limbs, twigs, etc., will be cut by the coacting blades 21 and 23.

It is believed that the many advantages of a hedge trimmer constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

A hedge trimmer of the character described comprising a stationary lower bar, a guide on the rear edge of the lower bar intermediate the ends of the bar, arms projecting from the rear end of said lower bar and inclining upwardly, bearings on the outer ends of said arms, a crankshaft journaled in the bearings, an upper bar mounted for reciprocation on the lower bar and in said guide, coacting blades on the upper and lower bars, an arm on said guide inclining rearwardly and upwardly along the rear portion of the lower bar, a manually operable gear on the last-named arm, a gear on the crankshaft engaged with the first-named gear for actuation thereby, a pitman connecting the upper bar to the crankshaft for actuation thereby, and a handle on said guide.

MATTHEW S. RUDD.